(12) United States Patent
Watanabe et al.

(10) Patent No.: US 11,275,049 B2
(45) Date of Patent: Mar. 15, 2022

(54) GAS SENSOR

(71) Applicant: NGK INSULATORS, LTD., Aichi (JP)

(72) Inventors: Yusuke Watanabe, Nagoya (JP); Mika Kai, Nagoya (JP); Shiho Iwai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 215 days.

(21) Appl. No.: 16/661,188

(22) Filed: Oct. 23, 2019

(65) Prior Publication Data

US 2020/0132617 A1   Apr. 30, 2020

(30) Foreign Application Priority Data

Oct. 26, 2018   (JP) .............................. JP2018-201517

(51) Int. Cl.
*G01N 27/407*   (2006.01)

(52) U.S. Cl.
CPC ....... *G01N 27/407* (2013.01); *G01N 27/4072* (2013.01)

(58) Field of Classification Search
CPC ........... G01N 27/4071; G01N 27/4072; G01N 27/409; G01N 27/41
See application file for complete search history.

(56) References Cited

U.S. PATENT DOCUMENTS

| | | | |
|---|---|---|---|
| 6,284,112 B1 * | 9/2001 | Kato ..................... | G01N 27/419 204/425 |
| 6,355,152 B1 * | 3/2002 | Kato .................. | G01N 27/4072 204/425 |
| 8,623,187 B2 * | 1/2014 | Horisaka .............. | G01N 27/409 204/424 |
| 2005/0211554 A1 * | 9/2005 | Kurachi ............. | G01N 27/4071 204/426 |
| 2009/0120791 A1 | 5/2009 | Miyashita et al. | |
| 2010/0108540 A1 * | 5/2010 | Kato .................. | G01N 27/4067 205/781 |
| 2016/0258897 A1 * | 9/2016 | Sakakibara ............ | G01N 27/41 |
| 2019/0137441 A1 | 5/2019 | Nakagaki et al. | |

FOREIGN PATENT DOCUMENTS

| | | |
|---|---|---|
| JP | 4931074 B2 | 5/2012 |
| JP | 5253165 B2 | 7/2013 |
| JP | 5749781 B2 | 7/2015 |
| WO | 2017/222001 A1 | 12/2017 |

* cited by examiner

*Primary Examiner* — Alexander S Noguerola
(74) *Attorney, Agent, or Firm* — Mattingly & Malur, PC

(57) ABSTRACT

A gas sensor includes a structural body made from an oxygen ion conductive solid electrolyte, a gas introduction passage which is formed in the structural body and into which a gas to be measured is introduced, a main adjustment chamber that communicates with the gas introduction passage, and a measurement chamber that communicates with the main adjustment chamber. A buffer space that communicates with the gas introduction passage, and at least two diffusion rate control members that communicate with the buffer space, are provided between the gas introduction passage and the main adjustment chamber. The respective widths Wb1 and Wb2 of the diffusion rate control members are less than the respective widths Wa, Wc, and Wd of the gas introduction passage, the buffer space, and the main adjustment chamber.

8 Claims, 9 Drawing Sheets

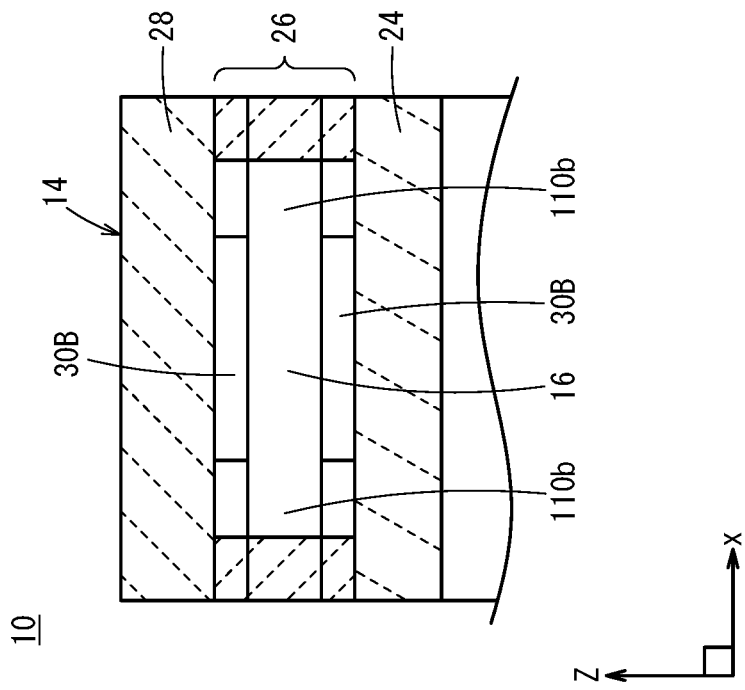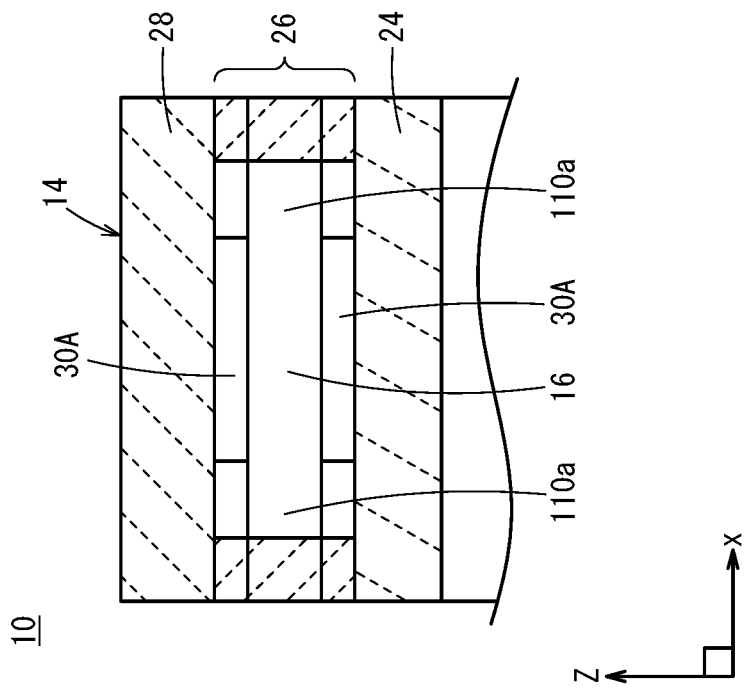

FIG. 8

[TABLE 1]

| STANDARD | Wb1/Wa | Wb1/Wc | Wb2/Wc | Wb2/Wd | L1/L2 | 1ST EXAMPLE DETERMINATION RESULT | 2ND EXAMPLE DETERMINATION RESULT |
|---|---|---|---|---|---|---|---|
| Exemplary Embodiment 1 | 0.83 | 0.83 | 0.77 | 0.77 | 35% | A | A |
| Exemplary Embodiment 2 | 0.65 | 0.60 | 0.72 | 0.67 | 35% | A | A |
| Exemplary Embodiment 3 | 0.80 | 0.80 | 0.80 | 0.80 | 35% | A | A |
| Exemplary Embodiment 4 | 0.60 | 0.60 | 0.60 | 0.60 | 35% | A | A |
| Exemplary Embodiment 5 | 0.35 | 0.35 | 0.35 | 0.35 | 35% | A | A |
| Exemplary Embodiment 6 | 0.90 | 0.90 | 0.90 | 0.90 | 35% | A | A |
| Exemplary Embodiment 7 | 0.94 | 0.93 | 0.96 | 0.92 | 35% | B | B |
| Comparative Example 1 | 1.00 | 1.00 | 1.00 | 1.00 | 35% | C | C |
| Comparative Example 2 | 1.00 | 1.25 | 1.00 | 1.00 | 35% | C | C |

FIG. 9

[TABLE 2]

| STANDARD | Wb1/Wa | Wb1/Wc | Wb2/Wc | Wb2/Wd | L1/L2 | 3RD EXAMPLE DETERMINATION RESULT | 4TH EXAMPLE DETERMINATION RESULT |
|---|---|---|---|---|---|---|---|
| Comparative Example 11 | 0.60 | 0.60 | 0.60 | 0.60 | 15% | C | C |
| Exemplary Embodiment 11 | 0.60 | 0.60 | 0.60 | 0.60 | 20% | B | B |
| Exemplary Embodiment 12 | 0.60 | 0.60 | 0.60 | 0.60 | 25% | B | B |
| Exemplary Embodiment 13 | 0.60 | 0.60 | 0.60 | 0.60 | 30% | A | A |
| Exemplary Embodiment 14 | 0.60 | 0.60 | 0.60 | 0.60 | 35% | A | A |
| Exemplary Embodiment 15 | 0.60 | 0.60 | 0.60 | 0.60 | 40% | A | A |
| Exemplary Embodiment 16 | 0.60 | 0.60 | 0.60 | 0.60 | 45% | B | B |
| Exemplary Embodiment 17 | 0.60 | 0.60 | 0.60 | 0.60 | 50% | B | B |
| Comparative Example 12 | 0.60 | 0.60 | 0.60 | 0.60 | 55% | C | C |

GAS SENSOR

CROSS-REFERENCE TO RELATED APPLICATION

This application is based upon and claims the benefit of priority from Japanese Patent Application No. 2018-201517 filed on Oct. 26, 2018, the contents of which are incorporated herein by reference.

BACKGROUND OF THE INVENTION

Field of the Invention

The present invention relates to a gas sensor in which an oxygen ion conductive solid electrolyte is used.

Description of the Related Art

Conventionally, gas sensors have been proposed which measure the concentrations of gases to be measured such as nitrogen oxide (NO) and ammonia ($NH_3$) or the like that coexist in the presence of oxygen, such as in an exhaust gas (refer to Japanese Patent No. 5749781, Japanese Patent No. 4931074, and Japanese Patent No. 5253165).

In Japanese Patent No. 5749781, as shown in FIG. 3 of the subject document, a configuration is disclosed in which there are arranged from a gas introduction hole to a main pump electrode, an introduction passage through which a gas to be measured is introduced, a buffer space that reduces the influence of pulsations in the exhaust pressure, a single diffusion layer that narrows down the gas, and a vacant chamber or space in which the main pump electrode is formed. However, since there is only one diffusion layer, poisonous substances that have entered through the introduction passage are rarely trapped midstream, and there is a concern that if such poisonous substances enter into the interior, the main pump electrode may become poisoned, thus resulting in a decrease in the gas detection accuracy.

Further, it has been observed that when the platinum of the main pump electrode evaporates and is discharged from the gas introduction hole, the platinum becomes adhered inside the protective cover, and as a result, $NH_3$ gas undergoes decomposition inside the protective cover, and the ability to detect $NH_3$ decreases.

Thus, in the gas sensor disclosed in Japanese Patent No. 4931074, as shown in FIG. 4 of the subject document, a trap section is formed in which a liquid form poisonous substance is accumulated on at least one wall surface of a measurement chamber formed between a diffusion rate control member and an inner side electrode. The trap section is formed by filling a recessed bottomed gap, which is formed on the wall surface, with a porous material.

In the gas sensor disclosed in Japanese Patent No. 5253165, as shown in FIG. 1 of the subject document, a harmful substance trapping layer, which is formed by a porous body that traps (captures) harmful substances, is formed on an upstream side separated away from a detection electrode of a gas flow section in which a gas to be measured flows through the interior of a solid electrolyte. More specifically, the harmful substance trapping layer is formed in a gas introduction port through which a gas to be measured is introduced from an external space into an internal space, and a buffer space that is formed between respective diffusion resistance members.

SUMMARY OF THE INVENTION

However, in the gas sensor disclosed in Japanese Patent No. 4931074, it is necessary to form the trap section for trapping the liquid form poisonous substance on at least one wall surface of the measurement chamber, while in addition, since it is necessary to form the trap section by filling a porous substance into the recessed bottomed gap that is formed on the wall surface, there is a concern that the configuration is complicated and large in scale, and the manufacturing process may become complicated.

In the gas sensor disclosed in Japanese Patent No. 5253165, it is necessary to form the harmful substance trapping layer in each of the gas introduction port and the buffer space, and further, in order to ensure flowing of the gas to be measured, it is necessary to form the harmful substance trapping layer by an alumina porous body having a porosity of greater than or equal to 40% and less than or equal to 80%. For this reason, there is a concern that the structure of the gas sensor is complicated and large in scale, and the manufacturing process may become complicated.

The present invention has the object of providing a gas sensor, in which there is no need to form a trap section, or a harmful substance trapping layer or the like in which a liquid form poisonous substance is accumulated, and which with a simple configuration, is capable of preventing poisoning from occurring to a main pump electrode, as well as suppressing a decrease in the gas detection accuracy.

An aspect of the present invention is characterized by a gas sensor comprising a structural body made from an oxygen ion conductive solid electrolyte, a gas introduction passage which is formed in the structural body and into which a gas to be measured is introduced, a main chamber configured to communicate with the gas introduction passage, and a measurement chamber configured to communicate with the main chamber, wherein a buffer space configured to communicate with the gas introduction passage, and at least two diffusion rate control members configured to communicate with the buffer space, are provided between the gas introduction passage and the main chamber, and respective widths of the diffusion rate control members are less than respective widths of the gas introduction passage, the buffer space, and the main chamber.

In accordance with the aspect described above, there is no need to form a trap section, or a harmful substance trapping layer or the like in which a liquid form poisonous substance is accumulated, and with a simple configuration, it is possible to prevent poisoning from occurring to the main pump electrode, and to suppress a decrease in the gas detection accuracy.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 7A is a cross-sectional view taken along line VIIA-VIIA in FIG. 6;

FIG. 7B is a cross-sectional view taken along line VIIB-VIIB in FIG. 6;

FIG. 8 is a table (Table 1) showing a breakdown of items and determination results of a first example and a second example;

FIG. 9 is a table (Table 2) showing a breakdown of items and determination results of a third example and a fourth example.

DESCRIPTION OF THE PREFERRED EMBODIMENTS

Preferred embodiments of the present invention will be presented and described below with reference to the accompanying drawings. In the present specification, the term "to" when used to indicate a numerical range is used with the implication of including the numerical values written before and after the term as a lower limit value and an upper limit value of the numerical range.

Figure 1:
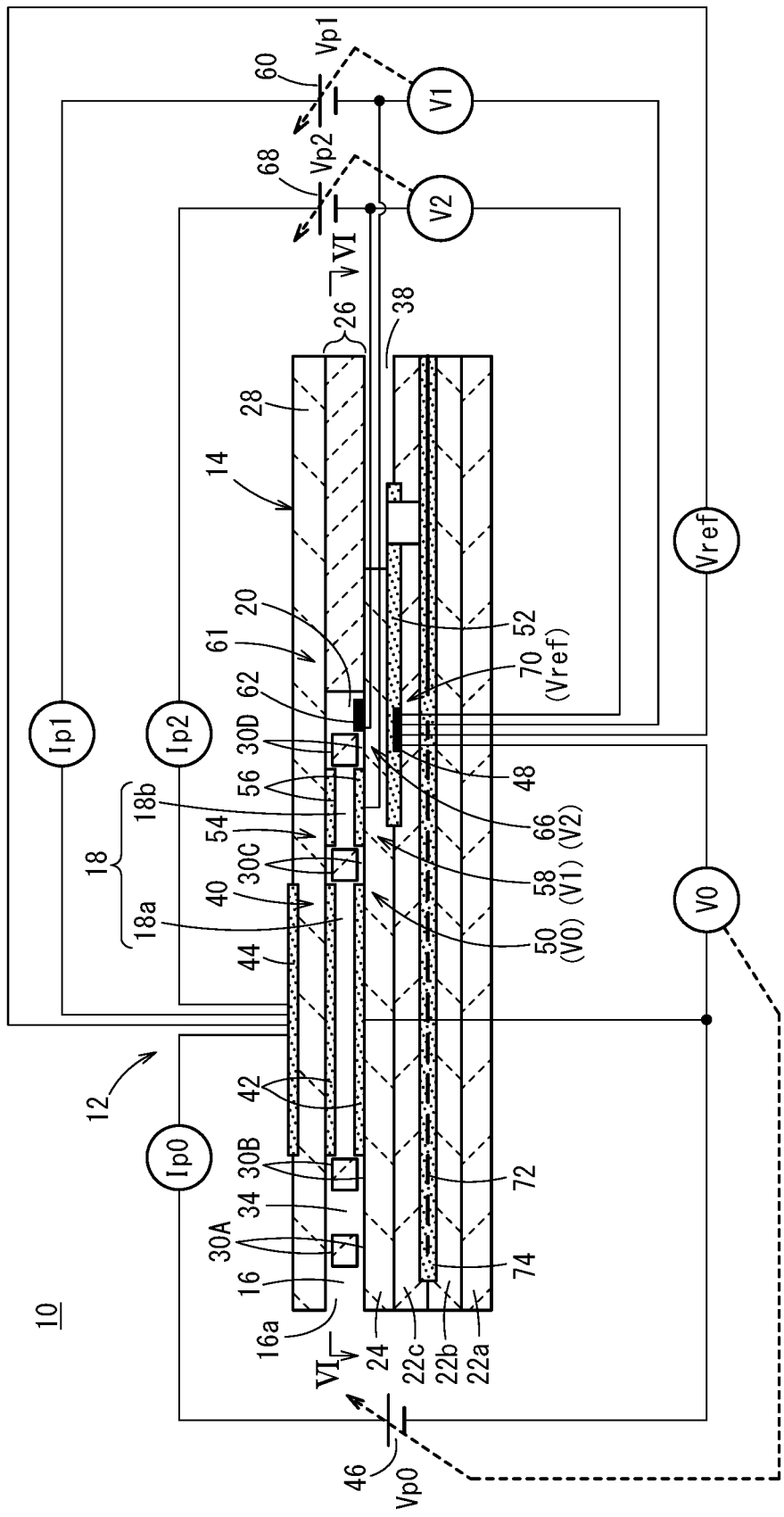
FIG. 1 is a cross-sectional view in which there is shown one structural example of a gas sensor according to the present embodiment.
Figure 2:
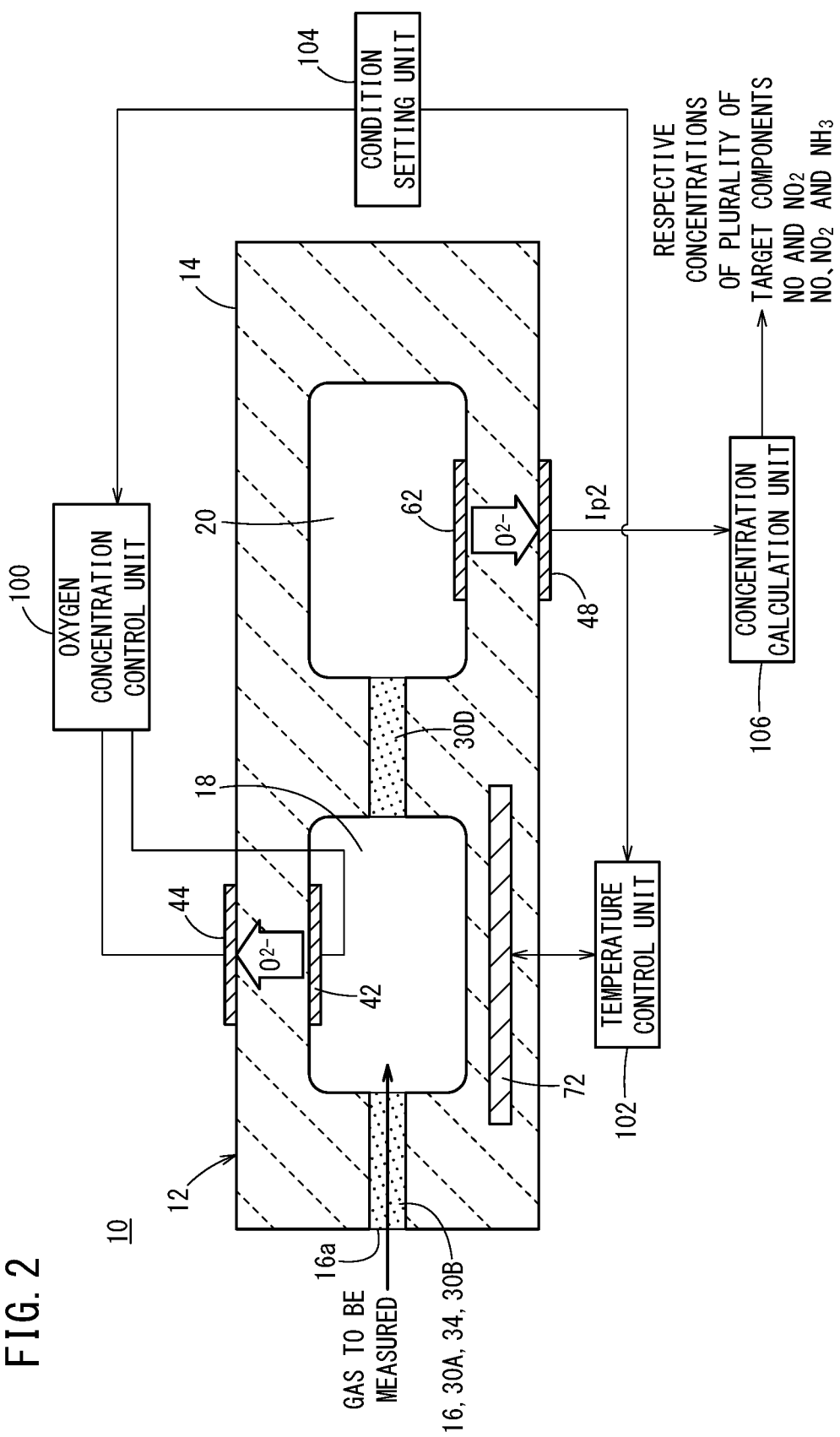
FIG. 2 is a configuration diagram schematically showing the gas sensor.

As shown in FIGS. 1 and 2, a gas sensor 10 according to the present embodiment includes a sensor element 12. The sensor element 12 includes a structural body 14 made up from a solid electrolyte that exhibits at least oxygen ion conductivity, a gas introduction passage 16 which is formed in the structural body 14 and into which a gas to be measured is introduced through an opening 16a, an oxygen concentration adjustment chamber 18 formed in the structural body 14 and communicating with the gas introduction passage 16, and a measurement chamber 20 formed in the structural body 14 and communicating with the oxygen concentration adjustment chamber 18.

The oxygen concentration adjustment chamber 18 includes a main adjustment chamber (main chamber) 18a communicating with the gas introduction passage 16, and an auxiliary adjustment chamber 18b communicating with the main adjustment chamber 18a. A measurement chamber 20 communicates with the auxiliary adjustment chamber 18b.

More specifically, the structural body 14 of the sensor element 12 is constituted by six layers including a first substrate layer 22a, a second substrate layer 22b, a third substrate layer 22c, a first solid electrolyte layer 24, a spacer layer 26, and a second solid electrolyte layer 28, which are stacked in this order from a lower side as viewed in the drawing. The respective layers are composed respectively of an oxygen ion conductive solid electrolyte layer such as zirconia ($ZrO_2$) or the like.

Between a lower surface of the second solid electrolyte layer 28 and an upper surface of the first solid electrolyte layer 24 on a distal end side of the sensor element 12, there are provided the gas introduction passage 16, a first diffusion rate control member 30A, a buffer space 34, a second diffusion rate control member 30B, the main adjustment chamber 18a, a third diffusion rate control member 30C, the auxiliary adjustment chamber 18b, and the measurement chamber 20. Among these elements, the gas introduction passage 16, the first diffusion rate control member 30A, the buffer space 34, the second diffusion rate control member 30B, the main adjustment chamber 18a, the third diffusion rate control member 30C, and the auxiliary adjustment chamber 18b are formed adjacent to each other in a manner communicating in this order. The portion from the gas introduction passage 16 leading to the measurement chamber 20 is also referred to as a gas flow section.

The gas introduction passage 16, the buffer space 34, the main adjustment chamber 18a, the auxiliary adjustment chamber 18b, and the measurement chamber 20 are internal spaces provided by hollowing out the spacer layer 26. All of the buffer space 34, the main adjustment chamber 18a, the auxiliary adjustment chamber 18b, and the measurement chamber 20 are arranged in a manner so that respective upper parts thereof are defined by a lower surface of the second solid electrolyte layer 28, respective lower parts thereof are defined by an upper surface of the first solid electrolyte layer 24, and respective side parts thereof are defined by side surfaces of the spacer layer 26.

Further, as shown in FIG. 1, a reference gas introduction space 38 is disposed between an upper surface of the third substrate layer 22c and a lower surface of the spacer layer 26, at a position that is farther from the distal end side than the gas flow section. The reference gas introduction space 38 is an internal space in which an upper part thereof is defined by a lower surface of the spacer layer 26, a lower part thereof is defined by an upper surface of the third substrate layer 22c, and side parts thereof are defined by side surfaces of the first solid electrolyte layer 24. For example, oxygen or atmospheric air is introduced as a reference gas into the reference gas introduction space 38.

The gas introduction passage 16 is a portion that opens with respect to the external space, and the gas to be measured is drawn into the sensor element 12 from the external space through the gas introduction passage 16.

The first diffusion rate control member 30A is a portion that imparts a predetermined diffusion resistance with respect to the gas to be measured, which is drawn in from the gas introduction passage 16.

The buffer space 34 is provided for the purpose of canceling fluctuations in the concentration of the gas to be measured, which are caused by pressure fluctuations of the gas to be measured in the external space (pulsations in the exhaust pressure, in the case that the gas to be measured is an exhaust gas of an automobile).

The second diffusion rate control member 30B is a portion that imparts a predetermined diffusion resistance to the gas to be measured, which is drawn into the main adjustment chamber 18a from the buffer space 34.

The main adjustment chamber 18a is provided as a space for the purpose of adjusting an oxygen partial pressure within the gas to be measured that is introduced through the gas introduction passage 16. The oxygen partial pressure is adjusted by operation of a main pump cell 40.

The main pump cell 40 comprises an electrochemical pump cell, which is constituted by a main interior side pump electrode 42, an exterior side pump electrode 44, and an oxygen ion conductive solid electrolyte which is sandwiched between the two pump electrodes. The main interior side pump electrode 42 is provided substantially over the entire surface of an upper surface of the first solid electrolyte layer 24, a lower surface of the second solid electrolyte layer 28, and side surfaces of the spacer layer 26 that define the main adjustment chamber 18a. The exterior side pump electrode 44 is provided in a condition of being exposed to the external space in a region corresponding to the main interior side pump electrode 42 on the upper surface of the second solid electrolyte layer 28. The main interior side pump electrode 42 and the exterior side pump electrode 44 are made of a material that weakens the reduction capability with respect to the NOx component within the gas to be measured. For example, the pump electrodes are formed as porous cermet electrodes (for example, cermet electrodes of $ZrO_2$ and a noble metal such as Pt containing 0.1 to 30.0 wt % of Au) having substantially rectangular shapes as viewed in plan.

The main pump cell 40 applies a pump voltage Vp0 supplied from a first variable power source 46 which is provided externally of the sensor element 12, and by allowing a pump current Ip0 to flow between the exterior side pump electrode 44 and the main interior side pump electrode 42, it is possible to pump oxygen in the interior of the main adjustment chamber 18*a* into the external space, or alternatively, to pump oxygen in the external space into the main adjustment chamber 18*a*.

Further, the sensor element 12 includes a first oxygen partial pressure detecting sensor cell 50 which is an electrochemical sensor cell. The first oxygen partial pressure detecting sensor cell 50 is constituted by the main interior side pump electrode 42, a reference electrode 48 sandwiched between the first solid electrolyte layer 24 and an upper surface of the third substrate layer 22*c*, and an oxygen ion conductive solid electrolyte sandwiched between these electrodes. The reference electrode 48 is an electrode having a substantially rectangular shape as viewed in plan, which is made from a porous cermet in the same manner as the exterior side pump electrode 44 and the like. Further, around the periphery of the reference electrode 48, a reference gas introduction layer 52 is provided, which is made from porous alumina and is connected to the reference gas introduction space 38. More specifically, the reference gas in the reference gas introduction space 38 is introduced to the surface of the reference electrode 48 via the reference gas introduction layer 52. In the first oxygen partial pressure detecting sensor cell 50, an electromotive force V0 is generated between the main interior side pump electrode 42 and the reference electrode 48, which is caused by the difference in oxygen concentration between the atmosphere in the interior of the main adjustment chamber 18*a* and the reference gas in the reference gas introduction space 38.

The electromotive force V0 generated in the first oxygen partial pressure detecting sensor cell 50 changes depending on the oxygen partial pressure of the atmosphere existing in the main adjustment chamber 18*a*. In accordance with the electromotive force V0, the sensor element 12 feedback-controls the first variable power source 46 of the main pump cell 40. Consequently, the pump voltage Vp0, which is applied by the first variable power source 46 to the main pump cell 40, can be controlled in accordance with the oxygen partial pressure of the atmosphere in the main adjustment chamber 18*a*.

The third diffusion rate control member 30C is a portion that imparts a predetermined diffusion resistance to the gas to be measured, the oxygen concentration (oxygen partial pressure) of which is controlled by operation of the main pump cell 40 in the main adjustment chamber 18*a*, and that guides the gas to be measured to the auxiliary adjustment chamber 18*b*.

The auxiliary adjustment chamber 18*b* is provided as a space for further carrying out adjustment of the oxygen partial pressure by an auxiliary pump cell 54, with respect to the gas to be measured, which is introduced through the third diffusion rate control member 30C, after the oxygen concentration (oxygen partial pressure) has been adjusted beforehand in the main adjustment chamber 18*a*. In accordance with this feature, the oxygen concentration inside the auxiliary adjustment chamber 18*b* can be kept constant with high accuracy, and therefore, the gas sensor 10 is made capable of measuring the NOx concentration with high accuracy.

The auxiliary pump cell 54 is an electrochemical pump cell, and is constituted by an auxiliary pump electrode 56, which is provided substantially over the entirety of the lower surface of the second solid electrolyte layer 28 facing toward the auxiliary adjustment chamber 18*b*, the exterior side pump electrode 44, and the second solid electrolyte layer 28.

Moreover, in the same manner as the main interior side pump electrode 42, the auxiliary pump electrode 56 is also formed using a material that weakens the reduction capability with respect to the NOx component within the gas to be measured.

The auxiliary pump cell 54, by applying a desired voltage Vp1 between the auxiliary pump electrode 56 and the exterior side pump electrode 44, is capable of pumping out oxygen within the atmosphere inside the auxiliary adjustment chamber 18*b* into the external space, or alternatively, is capable of pumping in oxygen from the external space into the auxiliary adjustment chamber 18*b*.

Further, in order to control the oxygen partial pressure within the atmosphere inside the auxiliary adjustment chamber 18*b*, an electrochemical sensor cell, and more specifically, a second oxygen partial pressure detecting sensor cell 58 for controlling the auxiliary pump, is constituted by the auxiliary pump electrode 56, the reference electrode 48, the second solid electrolyte layer 28, the spacer layer 26, and the first solid electrolyte layer 24.

Moreover, the auxiliary pump cell 54 carries out pumping by a second variable power source 60, the voltage of which is controlled based on an electromotive force V1 detected by the second oxygen partial pressure detecting sensor cell 58. Consequently, the oxygen partial pressure within the atmosphere inside the auxiliary adjustment chamber 18*b* is controlled so as to become a low partial pressure that does not substantially influence the measurement of NOx.

Further, together therewith, a pump current Ip1 of the auxiliary pump cell 54 is used so as to control the electromotive force V0 of the first oxygen partial pressure detecting sensor cell 50. More specifically, the pump current Ip1 is input as a control signal to the first oxygen partial pressure detecting sensor cell 50, and by controlling the electromotive force V0 thereof, the gradient of the oxygen partial pressure within the gas to be measured, which is introduced from the third diffusion rate control member 30C into the auxiliary adjustment chamber 18*b*, is controlled to remain constant at all times. When the gas sensor 10 is used as a NOx sensor, by the actions of the main pump cell 40 and the auxiliary pump cell 54, the oxygen concentration inside the auxiliary adjustment chamber 18*b* is maintained at a predetermined value with high accuracy for each of the respective conditions.

A fourth diffusion rate control member 30D is a portion that imparts a predetermined diffusion resistance to the gas to be measured, the oxygen concentration (oxygen partial pressure) of which is controlled by operation of the auxiliary pump cell 54 in the auxiliary adjustment chamber 18*b*, and that guides the gas to be measured to the measurement chamber 20.

Measurement of the NOx concentration is primarily performed by operations of a measurement pump cell 61 provided in the measurement chamber 20. The measurement pump cell 61 is an electrochemical pump cell constituted by a measurement electrode 62, the exterior side pump electrode 44, the second solid electrolyte layer 28, the spacer layer 26, and the first solid electrolyte layer 24. The measurement electrode 62 is provided, for example, directly on the upper surface of the first solid electrolyte layer 24 inside the measurement chamber 20, and is a porous cermet electrode made of a material whose reduction capability with respect to the NOx component within the gas to be measured is higher than that of the main interior side pump electrode 42. The measurement electrode 62 also functions as a NOx reduction catalyst for reducing NOx existing within the atmosphere above the measurement electrode 62.

The measurement pump cell 61 is capable of pumping out oxygen that is generated by the decomposition of nitrogen oxide within the atmosphere around the periphery of the measurement electrode 62 (inside the measurement chamber 20), and can detect the generated amount as a measurement pump current Ip2, or stated otherwise, as a sensor output.

Further, in order to detect the oxygen partial pressure around the periphery of the measurement electrode 62 (inside the measurement chamber 20), an electrochemical sensor cell, and more specifically, a third oxygen partial pressure detecting sensor cell 66 for controlling the measurement pump, is constituted by the first solid electrolyte layer 24, the measurement electrode 62, and the reference electrode 48. A third variable power source 68 is controlled based on a second electromotive force V2 detected by the third oxygen partial pressure detecting sensor cell 66.

The gas to be measured, which is introduced into the auxiliary adjustment chamber 18b, reaches the measurement electrode 62 inside the measurement chamber 20 through the fourth diffusion rate control member 30D, under a condition in which the oxygen partial pressure is controlled. Nitrogen oxide existing within the gas to be measured around the periphery of the measurement electrode 62 is reduced to thereby generate oxygen. Then, the generated oxygen is subjected to pumping by the measurement pump cell 61. At this time, a second voltage Vp2 of the third variable power source 68 is controlled in a manner so that the second electromotive force V2 detected by the third oxygen partial pressure detecting sensor cell 66 becomes constant. The amount of oxygen generated around the periphery of the measurement electrode 62 is proportional to the concentration of nitrogen oxide within the gas to be measured. Accordingly, the nitrogen oxide concentration within the gas to be measured can be calculated using the measurement pump current Ip2 of the measurement pump cell 61. More specifically, the measurement pump cell 61 constitutes a specified component measurement unit for measuring the concentration of a specified component (NO) in the measurement chamber 20.

Further, the gas sensor 10 includes an electrochemical sensor cell 70. The sensor cell 70 includes the second solid electrolyte layer 28, the spacer layer 26, the first solid electrolyte layer 24, the third substrate layer 22c, the exterior side pump electrode 44, and the reference electrode 48. In accordance with the electromotive force Vref obtained by the sensor cell 70, it is possible to detect the oxygen partial pressure within the gas to be measured existing externally of the sensor.

Furthermore, in the sensor element 12, a heater 72 is formed in a manner of being sandwiched from above and below between the second substrate layer 22b and the third substrate layer 22c. The heater 72 generates heat by being supplied with power from the exterior through a non-illustrated heater electrode provided on a lower surface of the first substrate layer 22a. As a result of the heat generated by the heater 72, the oxygen ion conductivity of the solid electrolyte that constitutes the sensor element 12 is enhanced. The heater 72 is embedded from the buffer space 34 over the entire region of the oxygen concentration adjustment chamber 18, and a predetermined location including the gas introduction passage 16 of the sensor element 12 can be heated and maintained at a predetermined temperature that is greater than or equal to 600° C. Moreover, a heater insulating layer 74 made of alumina or the like is formed on upper and lower surfaces of the heater 72, for the purpose of obtaining electrical insulation thereof from the second substrate layer 22b and the third substrate layer 22c (hereinafter, the heater 72, the heater electrode, and the heater insulating layer 74 may also be referred to collectively as a heater portion).

Furthermore, as schematically shown in FIG. 2, the gas sensor 10 includes an oxygen concentration control unit 100, a temperature control unit 102, a condition setting unit 104, and a concentration calculation unit 106. The oxygen concentration control unit 100 controls the oxygen concentration in the oxygen concentration adjustment chamber 18. The temperature control unit 102 controls the temperature of the sensor element 12. The condition setting unit 104 sets at least one of the oxygen concentration in the oxygen concentration adjustment chamber 18 and the temperature of the sensor element 12 to a condition corresponding to the type of target component of the gas to be measured that was introduced. The concentration calculation unit 106 calculates the concentrations of the plurality of different target components, on the basis of the respective sensor outputs obtained under a plurality of conditions corresponding to the types of target components.

Moreover, the oxygen concentration control unit 100, the temperature control unit 102, the condition setting unit 104, and the concentration calculation unit 106 are constituted by one or more electronic circuits having, for example, one or a plurality of CPUs (central processing units), memory devices, and the like. The electronic circuits are software-based functional units in which predetermined functions are realized, for example, by the CPUs executing programs stored in a storage device. Of course, the electronic circuits may be constituted by an integrated circuit such as an FPGA (Field-Programmable Gate Array), in which the plurality of electronic circuits are connected according to the functions thereof.

By being equipped with the oxygen concentration control unit 100, the temperature control unit 102, the condition setting unit 104, and the concentration calculation unit 106, the above-described gas sensor 10 is made capable of measuring the respective concentrations of NO, $NO_2$, and $NH_3$.

On the basis of the conditions set by the condition setting unit 104, and the electromotive force V0 generated in the first oxygen partial pressure detecting sensor cell 50 (see FIG. 1), the oxygen concentration control unit 100 feedback-controls the first variable power source 46, thereby adjusting the oxygen concentration inside the oxygen concentration adjustment chamber 18 to a concentration in accordance with the above-described conditions.

The temperature control unit 102 feedback-controls the heater 72 on the basis of the conditions set by the condition setting unit 104, and the measured value from a temperature sensor (not shown) that measures the temperature of the sensor element 12, whereby the temperature of the sensor element 12 is adjusted to a temperature in accordance with the above-described conditions.

The condition setting unit 104 sets as a first condition a condition for converting all of the $NO_2$ into NO without causing decomposition of the NO, sets as a second condition a condition for converting a portion of the $NO_2$ into NO without causing decomposition of the NO, and furthermore, sets as a third condition a condition for partially decomposing NO, and converting a portion of the $NH_3$ into NO.

Figure 3:
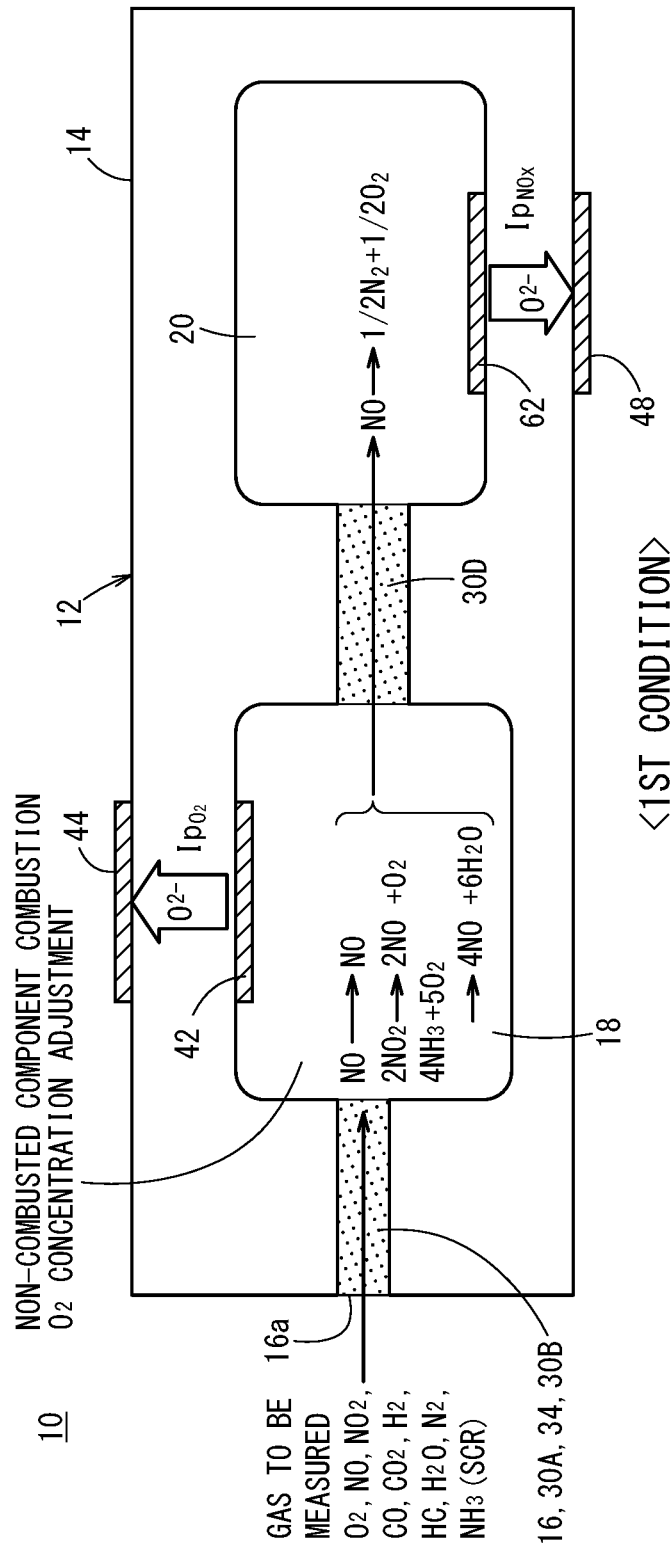
FIG. 3 is an explanatory diagram schematically showing a reaction in an oxygen concentration adjustment chamber and a reaction in a measurement chamber under a first condition in the sensor.

First, in the case of being set to the first condition, as shown in FIG. 3, NO is not decomposed inside the oxygen concentration adjustment chamber 18, but remains as is in the form of NO. In regards to $NO_2$, a decomposition reaction of $2NO_2 \rightarrow 2NO+O_2$ occurs. In regards to $NH_3$, the $NH_3$ is oxidized into NO by an oxidation reaction of $4NH_3+5O_2 \rightarrow 4NO+6H_2O$. Accordingly, NO enters into the measurement chamber 20 from the oxygen concentration adjustment chamber 18, whereas $NO_2$ and $NH_3$ do not enter therein. Inside the measurement chamber 20, a decomposition reaction of $NO \rightarrow (1/2)N_2+(1/2)O_2$ occurs, and among the products of the reaction, in accordance with the $O_2$ being pumped out, it is detected as a sensor output (measurement pump current Ip2).

Figure 4:
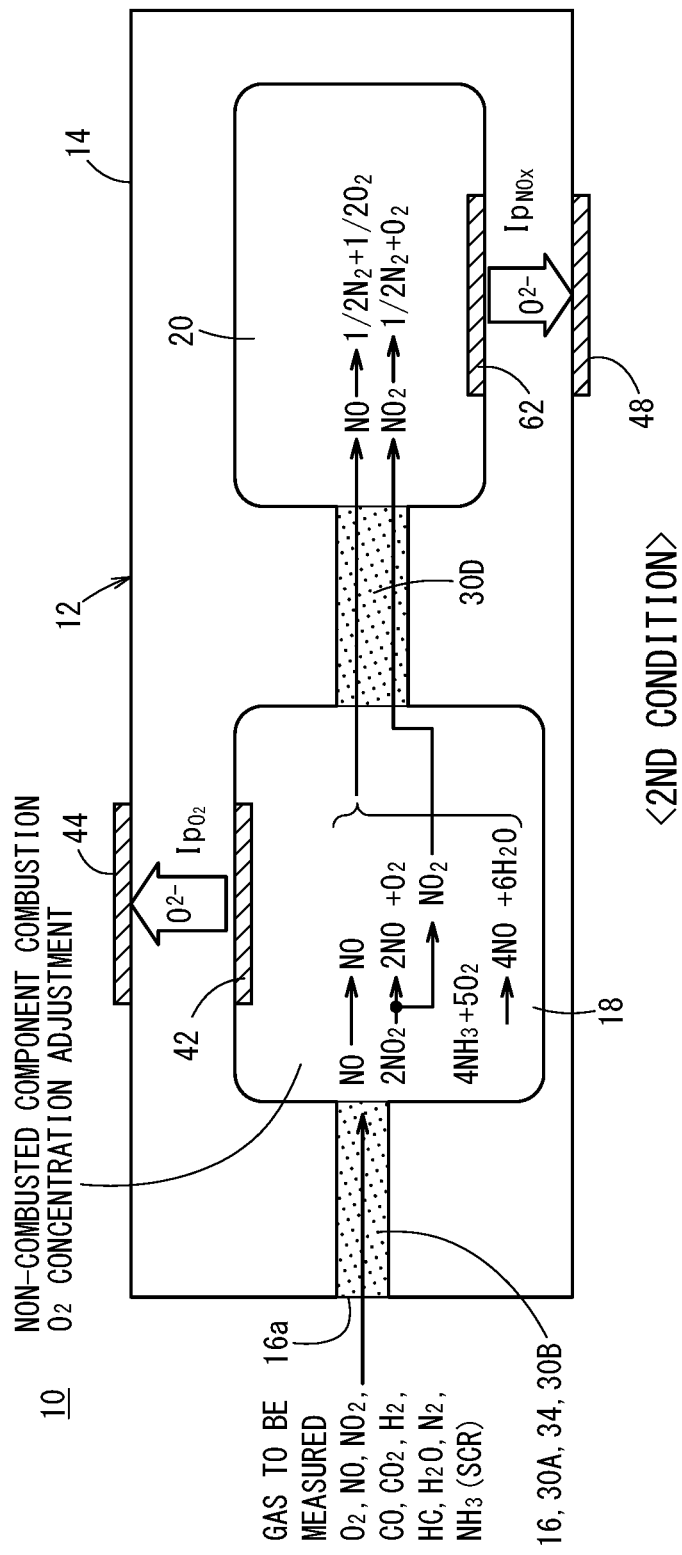
FIG. 4 is an explanatory diagram schematically showing a reaction in an oxygen concentration adjustment chamber and a reaction in a measurement chamber under a second condition in the sensor.

In the case of being set to the second condition, as shown in FIG. 4, NO is not decomposed inside the oxygen concentration adjustment chamber 18, but remains as is in the form of NO. In regards to $NO_2$, for example, 80% of the $NO_2$ is decomposed into NO by a decomposition reaction of $2NO_2 \rightarrow 2NO+O_2$, and the remaining 20% of the $NO_2$ is not decomposed. In regards to $NH_3$, the $NH_3$ is oxidized into NO by an oxidation reaction of $4NH_3+5O_2 \rightarrow 4NO+6H_2O$. Accordingly, NO and $NO_2$ enter into the measurement chamber 20 from the oxygen concentration adjustment chamber 18. Inside the measurement chamber 20, a decomposition reaction of $NO \rightarrow (1/2)N_2+(1/2)O_2$, and a decomposition reaction of $NO_2 \rightarrow (1/2)N_2+O_2$ occur. Among the products of the reactions, in accordance with the $O_2$ being pumped out, it is detected as a sensor output (measurement pump current Ip2). In this case, excessive oxygen ions are brought in by the $NO_2$ which has entered into the measurement chamber 20, and the sensor output becomes larger in comparison with the first condition and the third condition.

Figure 5:
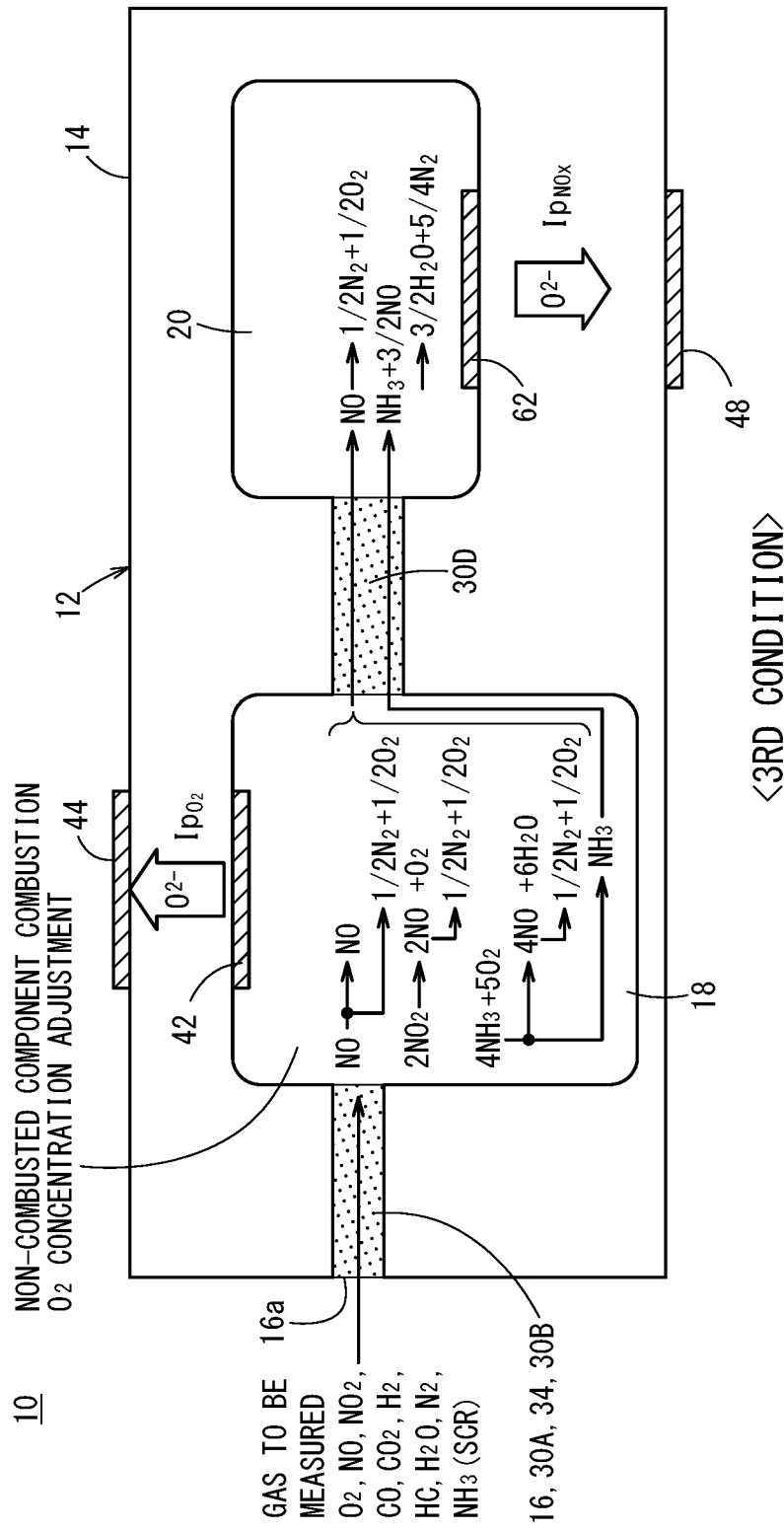
FIG. 5 is an explanatory diagram schematically showing a reaction in an oxygen concentration adjustment chamber and a reaction in a measurement chamber under a third condition in the sensor.

In the case of being set to the third condition, as shown in FIG. 5, in regards to NO, for example, 20% of the NO is decomposed inside the oxygen concentration adjustment chamber 18 by the decomposition reaction of $(1/2)N_2+(1/2)O_2$, whereas the remaining 80% of the NO is not decomposed. In regards to $NO_2$, a decomposition reaction of $2NO_2 \rightarrow 2NO+O_2$ occurs, and together therewith, 20% of the NO produced in the decomposition reaction is also decomposed by a decomposition reaction of $(1/2)N_2+(1/2)O_2$. In regards to $NH_3$, for example, 90% of the $NH_3$ is oxidized into NO by an oxidation reaction of $4NH_3+5O_2 \rightarrow 4NO+6H_2O$, and the remaining 10% of the $NH_3$ is not oxidized. In this case as well, 20% of the NO produced by the oxidation reaction is decomposed by the decomposition reaction of $(1/2)N_2+(1/2)O_2$.

Accordingly, NO and $NH_3$ enter into the measurement chamber 20 from the oxygen concentration adjustment chamber 18. Inside the measurement chamber 20, a decomposition reaction of $NO \rightarrow (1/2)N_2+(1/2)O_2$, and a decomposition reaction of $NH_3+(3/2)NO \rightarrow (3/2)H_2O+(5/4)N_2$ occur. In this case, the NO inside the measurement chamber 20 is consumed by the decomposition of $NH_3$, and the sensor output is lower in comparison with the first condition and the second condition.

In addition, a first relational expression (1) between a sensor output IP1 under the first condition, a sensor output (NO) corresponding to the NO concentration, a sensor output ($NO_2$) corresponding to the $NO_2$ concentration, and a sensor output ($NH_3$) corresponding to the $NH_3$ concentration under the first condition is expressed in the following manner.

$$IP1 = NO + 0.9NO_2 + 1.1NH_3 + OS1 \quad (1)$$

Similarly, a second relational expression (2) between a sensor output IP2 under the second condition, a sensor output (NO) corresponding to the NO concentration, a sensor output ($NO_2$) corresponding to the $NO_2$ concentration, and a sensor output ($NH_3$) corresponding to the $NH_3$ concentration under the second condition is expressed in the following manner.

$$IP2 = NO + 1.12NO_2 + 1.1NH_3 + OS2 \quad (2)$$

Similarly, a third relational expression (3) between a sensor output IP3 under the third condition, a sensor output (NO) corresponding to the NO concentration, a sensor output ($NO_2$) corresponding to the $NO_2$ concentration, and a sensor output ($NH_3$) corresponding to the $NH_3$ concentration under the third condition is expressed in the following manner.

$$IP3 = 0.9NO + 0.8NO_2 + 0.72NH_3 + OS3 \quad (3)$$

From the fact that all of the offset currents OS1, OS2, and OS3 are constants, by simultaneously solving the trinomial equations of the first relational expression (1), the second relational expression (2), and the third relational expression (3), it is possible to calculate the NO concentration, the $NO_2$ concentration, and the $NH_3$ concentration in the gas to be measured in which NO, $NO_2$, and $NH_3$ are mixed.

Concerning the details of the first condition, the second condition, and the third condition, reference should be made to PCT International Patent Application Publication No. WO 2017/222001.

In the aforementioned example, although an example has been shown of detecting an NO concentration, an $NO_2$ concentration, and an $NH_3$ concentration in a gas to be measured in which NO, $NO_2$, and $NH_3$ are mixed, it is a matter of course that only the NO concentration, only the $NO_2$ concentration, or only the $NH_3$ concentration may be detected.

Figure 6:
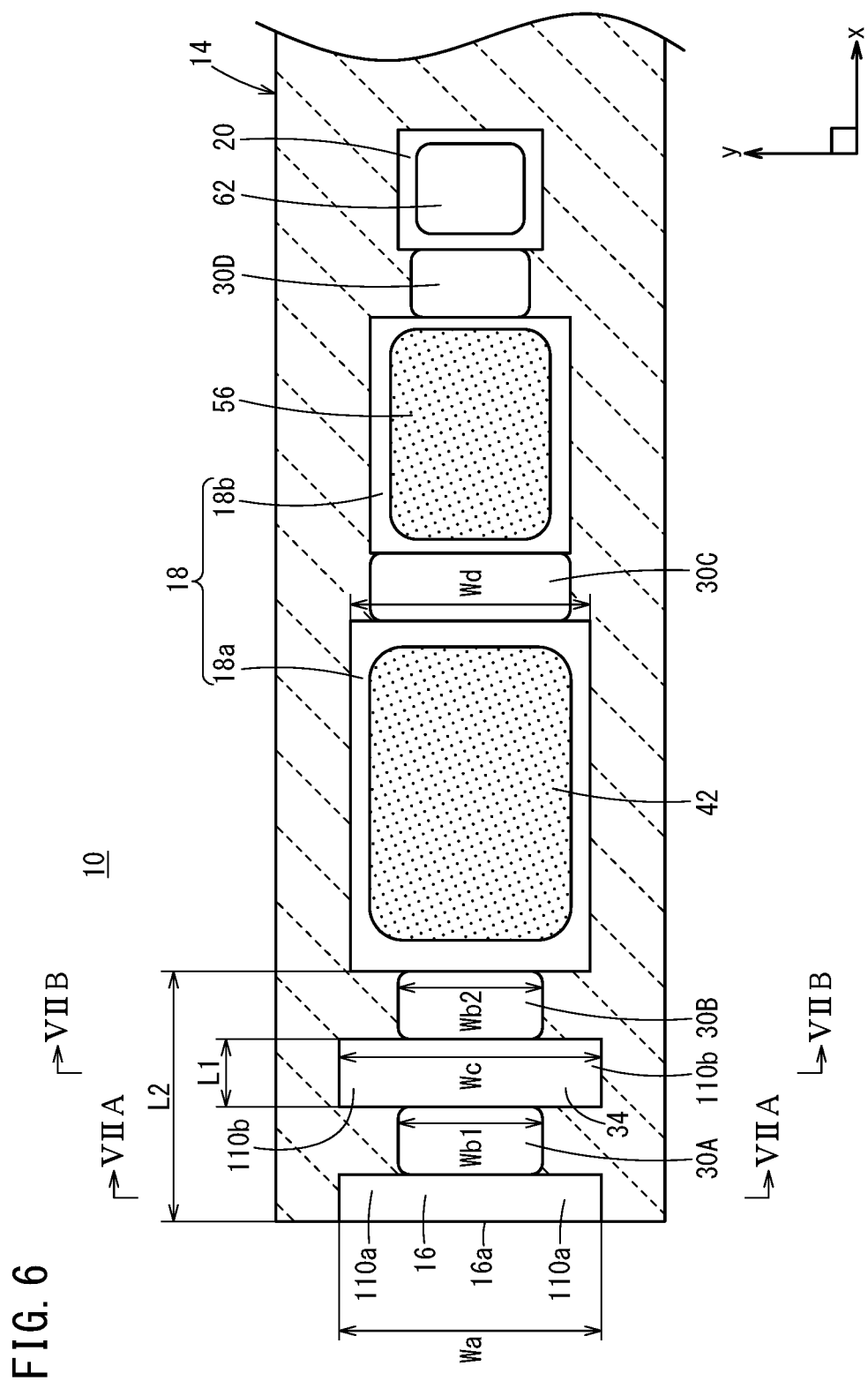
FIG. 6 is a cross-sectional view taken along line VI-VI in FIG. 1.

Additionally, as shown in FIGS. 6 to 7B, in the gas sensor 10 according to the present embodiment, all of the first diffusion rate control member 30A, the second diffusion rate control member 30B, the third diffusion rate control member 30C, and the fourth diffusion rate control member 30D are provided as two upper and lower horizontally elongated slits.

The width Wb1 of the first diffusion rate control member 30A and the width Wb2 of the second diffusion rate control member 30B are both less than the width Wa of the gas introduction passage 16, the width Wc of the buffer space 34, and the width Wd of the main adjustment chamber 18a. The respective widths Wa, Wb1, Wb2, Wc, and Wd are lengths along a lateral direction (y-direction) of the gas sensor 10, assuming that the longitudinal direction of the gas sensor 10 is the x-direction.

Consequently, first spaces 110a are formed at both ends in the width direction of the gas introduction passage 16, and similarly, second spaces 110b are formed at both ends in the width direction of the buffer space 34. Due to the existence of the first spaces 110a and the second spaces 110b, poisonous substances introduced from the exterior are easily trapped within the first spaces 110a and the second spaces 110b, and it is possible to prevent poisoning of the main interior side pump electrode 42 as well as to suppress a decrease in the gas detection accuracy. Further, since platinum that is evaporated from the main interior side pump electrode 42 is also easily trapped in the first spaces 110a and the second spaces 110b, the amount of platinum that adheres to the protective cover (not shown) can be reduced, and it is possible to suppress any decrease in the ability to detect the $NH_3$ gas.

More specifically, in the gas sensor 10 according to the present embodiment, there is no need to form a trap section, or a harmful substance trapping layer or the like in which a liquid form poisonous substance is accumulated, and with a simple configuration, it is possible to prevent poisoning from occurring to the main interior side pump electrode 42, and to suppress a decrease in the gas detection accuracy.

EXAMPLES

In relation to gas sensors according to Exemplary Embodiments 1 to 7 and Comparative Examples 1 and 2, an engine poisoning test (first example) and an $NH_3$ interference test (second example) were implemented.

Further, in relation to gas sensors according to Exemplary Embodiments 11 to 17 and Comparative Examples 11 and 12, an engine poisoning test (third example) and an $NH_3$ interference test (fourth example) were implemented.

First Example and Second Example

Exemplary Embodiments 1 to 7 and Comparative Examples 1 and 2

A breakdown of items of Exemplary Embodiments 1 to 7 and Comparative Examples 1 and 2 is shown in Table 1 of FIG. 8.

First Example (Testing Method)
The pump currents Ip0 of the gas sensors according to Exemplary Embodiments 1 to 7 and Comparative Examples 1 and 2, after having been exposed for 100 hours to an exhaust gas at 500° C. containing a component (ZnDTP: 0.25 cc/liter) simulating a poisonous substance, were measured.

(Determination Method)
A: The rate of change in sensitivity of the pump current Ip0 lies within 5%.
B: The rate of change in sensitivity of the pump current Ip0 is greater than 5% and lies within 10%.
C: The rate of change in sensitivity of the pump current Ip0 is greater than or equal to 10%.

Second Example (Testing Method)
Changes in $NH_3$ interference (the ability to detect $NH_3$) of the gas sensors according to Exemplary Embodiments 1 to 7 and Comparative Examples 1 and 2, after having been driven in the atmosphere for 3000 hours, were confirmed.
(Determination Method)
A: The rate of change lies within 10%.
B: The rate of change is greater than 10% and lies within 20%.
C: The rate of change is greater than 20%.

The determination results of the first example and the second example are shown in Table 1 of FIG. 8. From the results shown in Table 1, in Exemplary Embodiments 1 to 6, the determination result was "A" in both the first example and the second example. In Exemplary Embodiment 7, the determination result was "B" in both the first example and the second example. In contrast thereto, in Comparative Examples 1 and 2, the determination result was "C" in both the first example and the second example.

<Consideration 1>
The following conclusions can be drawn from the determination results of the first example and the second example.

(a) The ratio Wb1/Wa between the width Wb1 of the first diffusion rate control member 30A and the width Wa of the gas introduction passage 16 preferably satisfies 0.35≤Wb1/Wa≤0.94, and more preferably, satisfies 0.35≤Wb1/Wa≤0.90. In the case that Wb1/Wa is less than 0.35, the risk of the occurrence of cracking increases. In the case that Wb1/Wa is greater than 0.94, poisonous substances and soot cannot be sufficiently trapped in the first spaces 110a and the second spaces 110b.

(b) The ratio Wb1/Wc between the width Wb1 of the first diffusion rate control member 30A and the width Wc of the buffer space 34 preferably satisfies 0.35≤Wb1/Wc≤0.93, and more preferably, satisfies 0.35≤Wb1/Wc≤0.90. In the case that Wb1/Wc is less than 0.35, the risk of the occurrence of cracking increases. In the case that Wb1/Wc is greater than 0.93, poisonous substances and soot cannot be sufficiently trapped in the first spaces 110a and the second spaces 110b.

(c) The ratio Wb2/Wc between the width Wb2 of the second diffusion rate control member 30B and the width Wc of the buffer space 34 preferably satisfies 0.35≤Wb2/Wc≤0.96, and more preferably, satisfies 0.35≤Wb2/Wc≤0.90. In the case that Wb2/Wc is less than 0.35, the risk of the occurrence of cracking increases. In the case that Wb2/Wc is greater than 0.96, poisonous substances and soot cannot be sufficiently trapped in the first spaces 110a and the second spaces 110b.

(d) The ratio Wb2/Wd between the width Wb2 of the second diffusion rate control member 30B and the width Wd of the main adjustment chamber 18a preferably satisfies 0.35≤Wb2/Wd≤0.92, and more preferably, satisfies 0.35≤Wb2/Wd≤0.90. In the case that Wb2/Wd is less than 0.35, the risk of the occurrence of cracking increases. In the case that Wb2/Wd is greater than 0.92, platinum caused by vaporization of the main interior side pump electrode 42 of the main adjustment chamber 18a cannot be sufficiently trapped.

Third Example and Fourth Example

Exemplary Embodiments 11 to 17 and Comparative Examples 11 and 12

A breakdown of items of Exemplary Embodiments 11 to 17 and Comparative Examples 11 and 12 is shown in Table 2 of FIG. 9.

Third Example (Testing Method)
The pump currents Ip0 of the gas sensors according to Exemplary Embodiments 11 to 17 and Comparative Examples 11 and 12, after having been exposed for 100 hours to an exhaust gas at 500° C. containing a component (ZnDTP: 0.25 cc/liter) simulating a poisonous substance, were measured.
(Determination Method)

A: The rate of change in sensitivity of the pump current Ip0 lies within 5%.

B: The rate of change in sensitivity of the pump current Ip0 is greater than 5% and lies within 10%.

C: The rate of change in sensitivity of the pump current Ip0 is greater than or equal to 10%.

Fourth Example (Testing Method)

Changes in $NH_3$ interference (the ability to detect $NH_3$) of the gas sensors according to Exemplary Embodiments 11 to 17 and Comparative Examples 11 and 12, after having been driven in the atmosphere for 3000 hours, were confirmed.

(Determination Method)

A: The rate of change lies within 10%.

B: The rate of change is greater than 10% and lies within 20%.

C: The rate of change is greater than 20%.

The determination results of the third example and the fourth example are shown in Table 2 of FIG. 9. From the results shown in Table 2, in Exemplary Embodiments 13 to 15, the determination result was "A" in both the third example and the fourth example. In Exemplary Embodiments 11, 12, 16, and 17, the determination result was "B" in both the third example and the fourth example. In contrast thereto, in Comparative Examples 11 and 12, the determination result was "C" in both the third example and the fourth example.

<Consideration 2>

The following conclusions can be drawn from the determination results of the third example and the fourth example.

More specifically, the ratio L1/L2 between the length L1 of the buffer space 34 and the length L2 from the opening 16a (distal end of the structural body 14) of the gas introduction passage 16 to the main adjustment chamber 18a should preferably lie within a range of 20% to 50%, and more preferably, within a range of 30% to 40%. In the case that L1/L2 is less than 20%, poisonous substances and soot cannot be sufficiently trapped. In the case that L1/L2 is greater than 50%, the risk of the occurrence of cracking increases.

[Invention Obtained from the Embodiment]

A description will be given below concerning the invention that can be grasped from the above-described embodiment.

[1] The gas sensor 10 according to the present embodiment includes the structural body 14 made from an oxygen ion conductive solid electrolyte, the gas introduction passage 16 which is formed in the structural body 14 and into which the gas to be measured is introduced, the main adjustment chamber 18a configured to communicate with the gas introduction passage 16, and the measurement chamber 20 configured to communicate with the main adjustment chamber 18a. The buffer space 34 configured to communicate with the gas introduction passage 16, and at least two diffusion rate control members (the first diffusion rate control member 30A and the second diffusion rate control member 30B) configured to communicate with the buffer space 34, are provided between the gas introduction passage 16 and the main adjustment chamber 18a, and the widths Wb1 and Wb2 of each of the first diffusion rate control member 30A and the second diffusion rate control member 30B are less than the respective widths Wa, Wc, and Wd of the gas introduction passage 16, the buffer space 34, and the main adjustment chamber 18a.

In accordance with such a configuration, there is no need to form a trap section, or a harmful substance trapping layer or the like in which a liquid form poisonous substance is accumulated, and with a simple configuration, it is possible to prevent poisoning from occurring to the main pump electrode, and to suppress a decrease in the gas detection accuracy.

[2] In the present embodiment, the first diffusion rate control member 30A, the buffer space 34, and the second diffusion rate control member 30B may be positioned in this order from the gas introduction passage 16 toward the main adjustment chamber 18a.

[3] In the present embodiment, the ratio Wb1/Wa between the width Wb1 of the first diffusion rate control member 30A and the width Wa of the gas introduction passage 16 preferably satisfies 0.35≤Wb1/Wa≤0.90.

[4] In the present embodiment, the ratio Wb1/Wc between the width Wb1 of the first diffusion rate control member 30A and the width Wc of the buffer space 34 preferably satisfies 0.35≤Wb1/Wc≤0.90, or the ratio Wb2/Wc between the width Wb2 of the second diffusion rate control member 30B and the width Wc of the buffer space 34 preferably satisfies 0.35≤Wb2/Wc≤0.90.

[5] In the present embodiment, the ratio Wb2/Wd between the width Wb2 of the second diffusion rate control member 30B and the width Wd of the main adjustment chamber 18a preferably satisfies 0.35≤Wb2/Wd≤0.90.

[6] In the present embodiment, the ratio L1/L2 between the length L1 of the buffer space 34 and the length L2 from the distal end of the structural body 14 to the main adjustment chamber 18a preferably satisfies 20% L1/L2 50%.

[7] In the present embodiment, the temperature of the gas introduction passage 16 is preferably greater than or equal to 600° C.

Although the present invention has been described above by way of preferred embodiments, the present invention is not limited to the above-described embodiments, and it goes without saying that various modifications can be made within a range that does not depart from the essence and gist of the present invention.

In practicing the present invention, various configurations for improving reliability may be added as components for an automotive vehicle to such an extent that the concept of the present invention is not impaired.

What is claimed is:

1. A gas sensor comprising:
   a structural body made from an oxygen ion conductive solid electrolyte;
   a gas introduction passage into which a gas to be measured is introduced through an opening formed in one end surface of the structural body;
   a main chamber formed in the structural body configured to communicate with the gas introduction passage;
   a measurement chamber configured to communicate with the main chamber;
   a buffer space formed between the gas introduction passage and the main chamber and configured to communicate with the gas introduction passage;
   a first diffusion rate control member formed between the gas introduction passage and the buffer space and configured to communicate with the gas introduction passage and the buffer space; and
   a second diffusion rate control member formed between the buffer space and the main chamber and configured to communicate with the buffer space and the main chamber;
   wherein the gas introduction passage is provided with first spaces formed at both sides of the gas introduction passage in a width direction, the buffer space is provided with second spaces formed at both sides of the buffer space in the width direction, and respective widths along a lateral direction of the diffusion rate control members are less than respective widths along a lateral direction of the gas introduction passage, the buffer space, and the main chamber.

2. The gas sensor according to claim 1, wherein the at least two diffusion rate control members include a first diffusion rate control member and a second diffusion rate control member, and the first diffusion rate control member, the buffer space, and the second diffusion rate control member are positioned in this order from the gas introduction passage toward the main chamber.

3. The gas sensor according to claim 2, wherein a ratio Wb1/Wc between the width Wb1 of the first diffusion rate control member and the width Wc of the buffer space satisfies $0.35 \leq Wb1/Wc \leq 0.90$, or a ratio Wb2/Wc between the width Wb2 of the second diffusion rate control member and the width Wc of the buffer space satisfies $0.35 \leq Wb2/Wc \leq 0.90$.

4. The gas sensor according to claim 2, wherein a ratio Wb1/Wa between the width Wb1 of the first diffusion rate control member and the width Wa of the gas introduction passage satisfies $0.35 \leq Wb1/Wa \leq 0.90$.

5. The gas sensor according to claim 4, wherein a ratio Wb1/Wc between the width Wb1 of the first diffusion rate control member and the width Wc of the buffer space satisfies $0.35 \leq Wb1/Wc \leq 0.90$, or a ratio Wb2/Wc between the width Wb2 of the second diffusion rate control member and the width Wc of the buffer space satisfies $0.35 \leq Wb2/Wc \leq 0.90$.

6. The gas sensor according to claim 2, wherein a ratio Wb2/Wd between the width Wb2 of the second diffusion rate control member and the width Wd of the main chamber satisfies $0.35 \leq Wb2/Wd \leq 0.90$.

7. The gas sensor according to claim 1, wherein a ratio L1/L2 between a length L1 of the buffer space and a length L2 from a distal end of the structural body to the main chamber satisfies $20\% \leq L1/L2 \leq 50\%$.

8. The gas sensor according to claim 1, wherein a heater is formed in the structural body and is supplied with power from outside to raise a temperature of the gas introduction passage to greater than or equal to 600° C.

* * * * *